United States Patent Office 2,950,257
Patented Aug. 23, 1960

2,950,257

PREPARATION OF ELECTROLUMINESCENT PHOSPHORS

Herman C. Froelich, Cleveland Heights, Ohio, assignor to General Electric Company, a corporation of New York No Drawing. Filed Dec. 1, 1955, Ser. No. 550,458

2 Claims. (Cl. 252—301.6)

This invention relates generally to electroluminescent materials and their preparation, and more particularly to a process for making an improved electroluminescent phosphor containing zinc sulphide and zinc oxide with a copper activator.

This application is a continuation-in-part of my application Serial No. 266,241, filed January 12, 1952, now abandoned, and assigned to the asignee of this application.

An electroluminescent phosphor is one which produces light directly when subjected to a voltage and which does not require excitation by radiation such as ultraviolet or cathode rays. Such phosphors may produce light when a voltage is applied directly across them or when subjected to a varying electric field. A device utilizing the latter type of excitation and sometimes known as a luminous condenser or capacitor resembles a normal flat plate condenser except that at least one of the plates is transparent, and the space between the plates is occupied in whole or in part by an electroluminescent phosphor. For instance, the phosphor may be dispersed in a dielectric filling the space between the plates. When an alternating voltage is applied across the plates, the phosphor emits visible light which escapes through the transparent plate.

An object of the invention is to provide an electroluminescent phosphor having an improved response in the visible range.

Another object of the invention is to provide a process of treating an electroluminescent phosphor to shift the response from blue-green towards yellow-green.

A further object of the invention is to provide a method of preparation of a zinc sulphide, zinc oxide, copper-activated phosphor having a bright green electroluminescent response.

Other objects and advantages will appear in the following description of a preferred process for producing an electroluminescent phosphor in accordance with the invention.

An electroluminescent phosphor composed of zinc sulphide and zinc oxide with .01 to .1% copper as an activator and fired at a temperature in the range from 900 to 1040° C., will radiate blue-green light when subjected to an alternating electric field. I have found that the electroluminescent response of such a phosphor may be improved, as judged by a color shift towards yellow-green, and also by an increase in brightness under certain circumstances, by annealing it in the temperature range between 200 and 400° C., preferably at 300° C. An improvement is obtained whether the annealing is performed in a reducing, a neutral, or an oxidizing atmosphere; the most effective atmospheres however are reducing ones and the least effective ones are oxidizing atmospheres.

A phosphor having an electroluminescent response may be prepared by thoroughly mixing zinc sulphide and zinc oxide, to which copper between .01% and .1% by weight is added, preferably as a solution of a copper salt such as copper nitrate. After drying, the mix is fired at a temperature between 900–1040° C. to give the blue-green emitting electroluminescent phosphor. A preferred mixture consists of 75% zinc sulphide, 25% zinc oxide and .05% copper fired in a closed crucible in air at about 1000° C.

After the firing, the phosphor is subjected to the annealing process in the temperature range between 200 and 400° C. for improving the brightness of the response and shifting it toward the yellow-green. The optimum annealing temperature is approximately 300° C. The annealing may be performed in either reducing, neutral, or oxidizing atmospheres but the most effective atmosphere is a reducing one such as hydrogen or carbon monoxide. An improvement is obtained even when the annealing is performed in air; it is least when performed in a strongly oxidizing atmosphere such as pure oxygen. The most reducing atmospheres such as hydrogen, carbon-monoxide and mixtures thereof produce the greatest color shift towards yellow-green. The duration of the annealing may be varied from 10 to 60 minutes, depending upon the batch size, to secure the full benefit of the treatment. Prolonged annealing in excess of this time duration produces little further increase in brightness or shift in color.

I have found that the annealing process in accordance with my invention is effective in obtaining a favorable color shift of electroluminescent phosphors, that is a shift from blue-green towards yellow-green, in phosphors having a zinc sulphide base and with greater or lesser quantities than 25% of zinc oxide and including more or less than .05% copper as a primary activator. The amount of free zinc oxide may be reduced very substantially by a washing process to be described hereinafter, and improvements are nevertheless obtained with my annealing process. It is also effective where secondary activators are added to the primary copper activator: examples of these are silver, lead and lanthanum.

In addition, zinc sulphide-zinc oxide phosphors were prepared wherein the proportion of zinc oxide was varied from substantially 2 to 95 percent by weight while the proportion of zinc sulphide was varied inversely, and some degree of electroluminescent response was found throughout this range of proportions. Inasmuch as the unannealed phosphors exhibited an electroluminescent response, the annealing process of my invention produced the same qualitative improvement in response throughout the range.

It would seem that the most important effect of the reheating or annealing process is a slight structural change in the phosphor due to the annealing itself, the surrounding atmosphere playing only a secondary role. This view appears to be supported by the fact that a favorable color shift towards yellow-green may be obtained when the phosphor is being prepared, by a firing cycle consisting of normal firing at approximately 1000° C., followed by quick cooling to and prolonged annealing at 300° C., the whole being performed in air. The color shift obtained by this method is not as strong as with annealing in hydrogen as previously described.

With a phosphor prepared as dscribed above, the annealing process in .accordance with the invention produces both an increase in brightness and a shift towards yellow-green. However, it is also possible to obtain a further increase in brightness by following the annealing of the phosphor with a washing in a relatively weak acid such as 50% acetic acid to remove excess zinc oxide, and thereafter in a dilute cyanide solution such as sodium or potassium cyanide to remove superficial copper such as free copper sulphide from the phosphor. This washing process is disclosed in copending application No. 245,696, filed September 8, 1951, of Jerome S. Prener, entitled Electroluminescent Materials and Method of Preparation, and assigned to the same assignee as the present invention, now Patent 2,731,423. The washing process reduces the conductivity of the phosphor by reason of the removal of the excess copper. The removal of copper in the form of copper sulphide also increases the electroluminescent light output, apparently because copper sulphide, being black, is a light absorbent and its removal allows a greater portion of the generated electroluminescent light to escape from the crystal. However, if instead of annealing and then washing the phosphor as described, the sequence is inverted and the phosphor is first washed and then annealed, there still occurs a decided shift of the electroluminescent light toward the yellow-green but the improvement in brightness is diminished or may even disappear altogether.

In the case of an unwashed phosphor, the annealing in accordance with the invention results in a powder of lighter hue, as observed in natural light without excitation of the phosphor, than before treatment. This would indicate that the annealing process itself may cause some elimination of copper sulphide which is a black coloring agent. The elimination may occur as a result of chemical changes, or again as a result of physical changes such as the formation of fewer and larger copper sulphide particles. This would explain why unwashed phosphors show a decided increase in brightness in addition to the shift towards yellow-green, whereas washed phosphors show mainly a shift towards yellow-green.

While a certain specific process for preparing a phosphor in accordance with the invention has been described, various changes will occur to those skilled in the art and the example which has been described is to be considered as exemplary and not limitative. The invention is to be defined by the following claims which are intended to cover any modifications coming within its true spirit and scope.

What I claim as new and desire to secure by Letters Patent of the United States is:

1. A process for improving the electroluminescent response of a zinc sulphide, zinc oxide, copper activated phosphor wherein zinc oxide comprises from about 2 to about 95% by weight of the phosphor matrix and wherein copper amounts to .01 to .1% by weight and which has been fired at a temperature in the range from 900 to 1040° C., which process comprises annealing said phopshor at a temperature in the range from 200 to 400° C. for a duration of about 10 to 60 minutes.

2. A zinc sulphide, zinc oxide, copper activated phosphor wherein zinc oxide comprises from about 2 to about 95% by weight of the phosphor matrix and wherein copper amounts to about .01 to 1% by weight and which has been fired at a temperature in the range of 900 to 1040° C., and which thereafter has been annealed at a temperature in the range of 200 to 400° C. for a duration of about 10 to 60 minutes and is characterized by a color shift toward yellow-green as compared with the blue-green light of the unannealed phosphor.

References Cited in the file of this patent

UNITED STATES PATENTS

| | | |
|---|---|---|
| 2,660,566 | Froelich | Nov. 24, 1953 |
| 2,728,730 | Butler | Dec. 27, 1955 |
| 2,728,731 | Butler | Dec. 27, 1955 |
| 2,743,238 | Hunt | Apr. 24, 1956 |
| 2,745,811 | Butler | May 15, 1956 |
| 2,772,242 | Butler | Nov. 27, 1956 |
| 2,821,509 | Hunt | Jan. 28, 1958 |

OTHER REFERENCES

Kroger: "Luminescence of Solids," pp. 67–69 (1948), Elsevier Pub. Co., New York, N.Y.

Zalm: Philips Research Reports, vol. 9, NR. 2, April 1954, p. 84.